(12) United States Patent
Goto et al.

(10) Patent No.: US 8,679,692 B2
(45) Date of Patent: Mar. 25, 2014

(54) FUEL CELL HAVING ENHANCED HEAT DISSIPATION

(75) Inventors: Shuji Goto, Tokyo (JP); Kazuaki Fukushima, Kanagawa (JP); Sayaka Nanjo, Kanagawa (JP); Tetsuro Kusamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 673 days.

(21) Appl. No.: 12/593,527

(22) PCT Filed: Jan. 16, 2008

(86) PCT No.: PCT/JP2008/050391
§ 371 (c)(1),
(2), (4) Date: Sep. 28, 2009

(87) PCT Pub. No.: WO2008/120478
PCT Pub. Date: Oct. 9, 2008

(65) Prior Publication Data
US 2010/0119904 A1   May 13, 2010

(30) Foreign Application Priority Data
Mar. 29, 2007   (JP) ................. 2007-087119

(51) Int. Cl.
*H01M 8/04*   (2006.01)
*H01M 8/10*   (2006.01)
*H01M 8/22*   (2006.01)

(52) U.S. Cl.
USPC ............................ 429/433; 429/483; 429/506

(58) Field of Classification Search
USPC ......... 429/479, 452, 438, 439, 509, 434, 511, 429/506, 433, 483
See application file for complete search history.

(56) References Cited

U.S. PATENT DOCUMENTS 5,252,410 A * 10/1993 Wilkinson et al. ............ 429/438
5,470,671 A * 11/1995 Fletcher et al. ............... 429/434
(Continued)

FOREIGN PATENT DOCUMENTS

JP   62-010877   1/1987
JP   01-186768   7/1989
(Continued)

OTHER PUBLICATIONS

Certified English Translation of: JP 62/010877 A, Urkawa, Jan. 19, 1987.*

(Continued)

*Primary Examiner* — Kenneth Douyette
(74) *Attorney, Agent, or Firm* — K&L Gates LLP (57) ABSTRACT

A fuel cell is provided that prevents destabilization of power generation due to heat generated in an electrochemical device portion. In a fuel cell having a membrane-electrode assembly which performs power generation by chemical reaction, a membrane-electrode assembly is disposed with a space from another membrane-electrode assembly or two membrane-electrode assemblies are provided adjacent to each other so that the pair is disposed with a space from another membrane-electrode assembly or another pair, and one of the main surfaces of a membrane-electrode assembly is in contact with outside air. Conductive plates are disposed in contact with the membrane-electrode assembly in order to exchange a current generated in the membrane-electrode assembly with the outside, and radiation fins are provided on the conductive plate on the main surface side in contact with outside air so that the conductive plate serves as a radiation member.

16 Claims, 4 Drawing Sheets

(56) References Cited

U.S. PATENT DOCUMENTS

| | | | | |
|---|---|---|---|---|
| 5,686,200 | A | * | 11/1997 | Barton et al. .................. 429/511 |
| 2004/0258970 | A1 | * | 12/2004 | McLean .......................... 429/26 |
| 2006/0040156 | A1 | | 2/2006 | Tano et al. |
| 2006/0105213 | A1 | * | 5/2006 | Otsuka ............................ 429/26 |
| 2006/0292409 | A1 | * | 12/2006 | Son et al. ........................ 429/20 |
| 2007/0059575 | A1 | * | 3/2007 | Kan et al. ........................ 429/30 |

FOREIGN PATENT DOCUMENTS

| | | |
|---|---|---|
| JP | 10-092456 | 4/1998 |
| JP | 2000-106201 | 4/2000 |
| JP | 2000-123854 | 4/2000 |
| JP | 2000-353533 | 12/2000 |
| JP | 2001-102782 | 4/2001 |
| JP | 2005-102782 | 4/2005 |
| JP | 2005-108717 | 4/2005 |
| JP | 2005-142247 | 6/2005 |
| JP | 2005-254417 | 9/2005 |
| JP | 2007-080776 | 3/2007 |
| WO | 2005/013405 | 2/2005 |
| WO | 2006/101071 | 9/2006 |

OTHER PUBLICATIONS

International Search Report dated Jan. 16, 2008, for corresponding Patent Application PCT/JP2008/050391.

International Search Report mailed Oct. 29, 2009, for corresponding Patent Application PCT/JP2008/050391.

Japanese Patent Office, Notification of reasons for refusal issued in connection with Japanese Patent Application No. 2007-087119, dated Aug. 21, 2012. (3 pages).

* cited by examiner

PRIOR ART

FIG. 4

FUEL CELL HAVING ENHANCED HEAT DISSIPATION

CROSS REFERENCE TO RELATED APPLICATIONS

The present application is a National Stage of International Application No. PCT/JP2008/050391 filed on Jan. 16, 2008 and which claims priority to Japanese Patent Application No. 2007-087119 filed on Mar. 29, 2007, the entire contents of which are being incorporated herein by reference.

BACKGROUND

The present disclosure relates to a fuel cell, and particularly to a fuel cell in which countermeasure is taken against heat generated in a power generation cell, the fuel cell being suitable for miniaturization.

In recent years, in portable electronic apparatuses such as a cellular phone, a notebook-size personal computer, a digital camera, a camcorder, and the like, their functions have been advanced and diversified, and accordingly, power consumption tends to increase. Therefore, loads on power supplies have increased.

As power supplies for these portable electronic apparatuses, small primary cells or secondary cells are generally used. One of the characteristics of cells is an energy density. The term "energy density" represents a quantity of energy which can be taken out per unit mass or unit volume of a cell. Cells used for portable electronic apparatuses are required to be improved in energy density in order to comply with higher function and multi-function of electronic apparatuses.

When energy possessed by a primary cell is discharged, the cell cannot be reused. Although a primary cell has convenience that a portable electronic apparatus can be operated again by exchanging the cell with another cell, primary cells have a low energy density, many cells are required to be carried for driving a portable electronic apparatus which consumes much electric power, and thus primary cells are unsuitable as power supplies of portable electronic apparatuses.

Use of secondary cells has the advantage that even if energy stored in the cells is discharged, the cells are reproduced by charging and can be reused. However, the energy density is not sufficient to drive a portable electronic apparatus with large power consumption for a long time, and a charger and a power supply are required for charging, thereby limiting operation environments. Also, there is the problem that charging requires much time.

As described above, it is difficult to comply with drive of various portable electronic apparatuses for a long time by conventional primary cells, secondary cells, or extensions thereof, and power supplies suitable for drive for a longer time and based on a different principle are expected. One of such power supplies is a fuel cell. A fuel cell includes an anode, a cathode, and an electrolyte, wherein fuel is supplied to the anode side, and an oxidizer is supplied to the cathode side. At this time, an oxidation-reduction reaction takes place to oxidize the fuel with the oxidizer, and chemical energy possessed by the fuel is efficiently converted to electric energy.

Since a fuel cell is a power generator which generates electric power using a chemical reaction between fuel and an oxidizer, the fuel cell can be continuously used as a power supply by continuously using air oxygen as the oxidizer and supplying the fuel from the outside unless the fuel cell is damaged. Therefore, if fuel cells can be miniaturized, they become high-energy-density power supplies suitable for portable electronic apparatuses and not requiring charging.

Various types of fuel cells have already been proposed or made on an experimental basis, and some of them have been put into practical application. The properties of fuel cells significantly vary depending on the electrolytes used, and the fuel cells are classified into various types on the basis of the electrolytes used. Among these, polymer electrolyte fuel cells (PEFC) using proton conductive polymer membranes as electrolytes are operated at a low temperature of about 30° C. to 130° C. without using electrolytic solutions, and thus they can be miniaturized and are optimum as power supplies for portable electronic apparatuses.

As fuel for fuel cells, various combustible materials such as hydrogen, methanol, and the like can be used. However, gaseous fuel such as hydrogen has a low density and is not suitable for miniaturization because a high-pressure storage cylinder or the like is required for increasing the density. On the other hand, liquid fuel such as methanol has a high density compared with gases and can be easily stored, and thus liquid fuel is overwhelmingly advantageous as fuel for fuel cells for small apparatuses. Therefore, if fuel cells using liquid fuel can be miniaturized, inconventional power supplies for portable electronic apparatuses, which can be driven for a long time, can be realized.

In particular, direct methanol fuel cells (DMFC) in which a reaction is effected by supplying methanol directly to an anode of PEFC require no reformer for taking out hydrogen from fuel, are simply configured, and are easily miniaturized. The energy density of methanol is theoretically significantly higher than that of general lithium ion secondary cells. As described above, DMFC is considered most suitable as a power supply for portable electronic apparatuses which are increasingly miniaturized and made multifunctional and higher functional.

In DMFC, methanol as fuel is oxidized to carbon dioxide in an anode catalyst layer as shown by the following expression (1):

$$\text{Anode: } CH_3OH+H_2O \rightarrow CO_2+6H^++6e^- \qquad (1)$$

The hydrogen ions produced in this reaction move to the cathode side through a proton conductive polymer electrolyte membrane held between the anode and cathode and react with oxygen in a cathode catalyst layer as shown by the following expression (2):

$$\text{Cathode: } 6H^++(3/2)O_2+6e^- \rightarrow 3H_2O \qquad (2)$$

The reaction taking place over the whole of DMFC is represented by combination of expressions (1) and (2), i.e., the following expression (3):

$$\text{Whole DMFC: } CH_3OH+(3/2)O_2 \rightarrow CO_2+2H_2O \qquad (3)$$

DMFC is roughly divided into a liquid supply type and a gas supply type according to a method for supplying methanol to an anode. The liquid supply type is a method of supplying liquid fuel as it is, in which an aqueous methanol solution is supplied to the anode using a pump. In DMFC, water is consumed by the electrode reaction (1) on the anode. Therefore, in many DMFC, an aqueous methanol solution is supplied to the anode to compensate for a loss of water. However, this type causes methanol crossover in which methanol passes through the polymer electrolyte membrane from the anode side to the cathode side and easily causes the problem of decreasing the efficiency of utilization of methanol.

The gas supply type is a method of supplying vaporized methanol to the anode, in which the liquid fuel stored in a fuel tank is sent to a vaporizing chamber with a pump and naturally evaporated in the vaporizing chamber or forcedly evaporated by heater heating (refer to Patent Publication No. 3413111). There is a method of naturally evaporating the fuel in a fuel tank or forcedly evaporating the fuel by heater heating in the fuel tank.

In the gas supply type, the water produced on the cathode is backward diffused to the anode side to prevent residence of water on the cathode, compensate for the water consumed by the electrode reaction (1) on the anode, maintain water in the polymer electrolyte membrane by self humidification, and allow the polymer electrolyte membrane to exhibit high proton conductivity. The gas supply type is known as a method which causes relatively little methanol crossover. In addition, swelling of the polymer electrolyte membrane can be suppressed, thereby stabilizing a membrane-electrode assembly.

In both the liquid supply type and the gas supply type, air is supplied to a power generation portion by a forced method using a pump or fan or a method using natural diffusion or convection of air without using a pump or fan.

As a method of stabilizing the supply of methanol and air, a method of controlling the supply rate using a pump, a blower, or a heater can be used. However, such an auxiliary part inhibits miniaturization of DMFC and has the side of impairing a characteristic of DMFC, i.e., the high energy density. Therefore, a power supply for portable electronic apparatuses preferably uses, as the methanol supplying method, the gas supply type of naturally evaporating fuel in a fuel tank and uses the method utilizing natural diffusion or convection as the air supplying method.

However, in this case, the fuel supply rate is strongly affected by the temperature of a space in which methanol is evaporated, and thus when the temperature of the space is excessively increased by heat generated with power generation, the fuel is excessively supplied, causing methanol crossover. In addition, the gas supply type requires that the water produced on the cathode side inversely diffuses in the electrolyte membrane and is supplied to the cathode side, but when the temperature of the polymer electrolyte membrane becomes excessively high, the water produced on the cathode side and the water contained in the electrolyte membrane are lost by evaporation, thereby causing the problem of making it impossible to supply water necessary for a reaction on the anode.

Overheating with the heat generated with power generation has the property that the situation gradually worsens once it occurs. For example, when the fuel is excessively supplied due to overheating of the space for evaporating methanol, thereby causing methanol crossover, the situation is easily caught in a vicious circle in which the crossover methanol is oxidized on the cathode, and the generated heat further increases the temperature of the methanol evaporation space, thereby further causing excessive supply of the fuel and methanol crossover. In addition, when water is lost from the polymer electrolyte membrane at a high temperature, there occurs a vicious circle where the internal resistance of the polymer electrolyte membrane is increased, and consequently, resistance heat generation is increased, thereby further increasing the temperature of the polymer electrolyte membrane due to the generated heat.

As a method of stabilizing the temperature by controlling the heat generated by power generation without using a pump or a fan, there is a method of providing radiation means including a radiation fin at a position in contact with outside air. An example of a fuel cell provided with a radiation fin is proposed in, for example, Japanese Unexamined Patent Application Publication No. 2005-108717 (pages 3, 5, 6, and 9, particularly paragraphs [0005] and [0041], FIG. 7).

Figure 4:
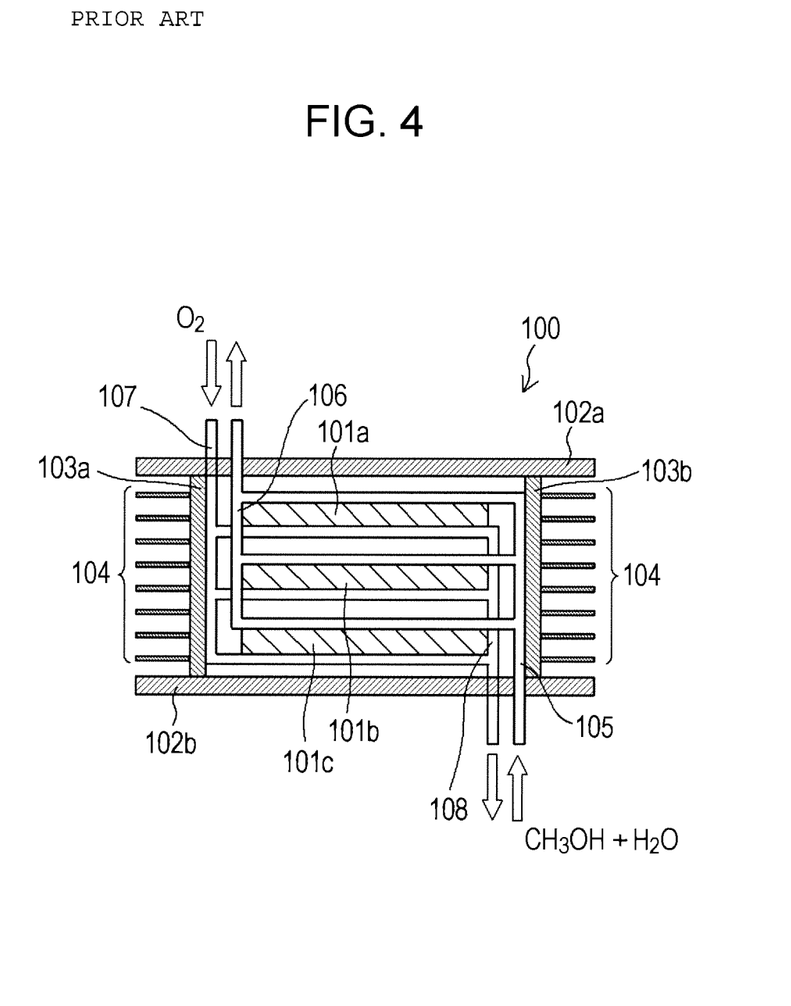
FIG. 4 is a sectional view showing a method of cooling an electromotive portion of a fuel cell disclosed in Japanese Unexamined Patent Application Publication No. 2005-108717.

FIG. 4 is a sectional view showing a method of cooling an electromotive portion of the fuel cell disclosed in Japanese Unexamined Patent Application Publication No. 2005-108717. The electromotive portion 100 is provided with a stack of three power generation cells 101a to 101c, a fuel supply passage 105 and a fuel discharge passage 106 are provided for supplying or discharging fuel to or from the power generation cells, and an air supply passage 107 and an air discharge passage 108 are provided for supplying or discharging air to or from the power generation cells. In addition, radiation fins 104 are provided on side walls 103a and 103b which constitute the side surfaces extending along the stacking direction of the power generation cells 101a to 101c. On the other hand, radiation fins are not provided on the end plates 102a and 102b which constitutes the end surfaces perpendicular to the stacking direction of the power generation cells.

In Japanese Unexamined Patent Application Publication No. 2005-108717, the characteristic of the cooling method for the electromotive portion 100 is described as follows: The radiation fins 104 provided on the side walls 103a and 103b radiate heat of the power generation cells 101a to 101c to the surroundings and cool these cells. Consequently, overheating of the cells is prevented. The side walls 103a and 103b extend along the stacking direction of the power generation cells 101a to 101c and position to face the plurality of power generation cells. Therefore, the plurality of power generation cells 101a to 101c can be uniformly cooled, and the occurrence of a difference in temperature between the power generation cells can be prevented. Further, the fuel discharge passage 106 and the air discharge passage 108 on the discharge side at the highest temperature extend in the stacking direction of the cells and are thus efficiently cooled with the radiation fins 104 provided on the side surfaces of the electromotive portion 100.

As a result, a difference in temperature and output variation between the plurality of power generation cells 101a to 101c can be suppressed, thereby permitting stable power generation. At the same time, breakage such as polarity inversion or the like in the power generation cells is prevented, thereby providing a fuel cell with improved reliability.

In the electromotive portion 100 disclosed in Japanese Unexamined Patent Application Publication No. 2005-108717, radiation fins are not provided on the end plates 102a and 102b which constitutes the end surfaces perpendicular to the stacking direction of the power generation cells 101a to 101c. In Japanese Unexamined Patent Application Publication No. 2005-108717, as the reason for this, it is described that when radiations fins are provided, for cooling, on the end plates 102a and 102b which constitutes the end surfaces in the electromotive portion 100 configured by stacking the plurality of power generation cells 101a to 101c, a temperature difference easily occurs between the power generation cells 101a and 101c provided at the ends in the stacking direction and the power generation cell 101b provided at the center, and consequently, output varies between the power generation cells and is not stabilized, leading to breakage such as polarity inversion due to a temperature difference in some cases.

That is, the cooling method for the electromotive portion 100 shown in FIG. 4 is a cooling method employed for minimizing variation between the stacked power generation cells as the high-priority issue and is a second-best method which is inevitably used because three or more power generation cells are stacked. Therefore, the structure of the electromotive portion 100 is not the best structure when consideration is given to cooling of one power generation cell with radiation fins with highest efficiency.

It is therefore desired to provide a fuel cell capable of preventing destabilization of power generation due to heat generated in an electrochemical device portion and preventing decrease in generation efficiency.

SUMMARY

One embodiment relates to a fuel cell including an electrochemical device portion in which power generation is performed by a chemical reaction, and a radiation member disposed at a position in contact with outside air and provided with radiation fins for radiating heat generated in the electrochemical device portion, the fuel cell being characterized in that:

the electrochemical device portion is disposed with a space from another electrochemical device portion or forms a pair of two electrochemical device portions provided adjacent to each other so that the pair is disposed with a space from another electrochemical device portion or another pair;

a conductive member for exchanging a current generated in the electrochemical device portion with the outside is disposed in contact with the electrochemical device portion; and the radiation member is provided in contact with the conductive member or part or the whole of the radiation fins are provided on at least a portion of the conductive member, which is in contact with outside air, so that the conductive member serves as the radiation member.

In general, when it is considered that heat generated in an electrochemical device portion of a fuel cell is radiated with as high efficiency as possible using a radiation member provided with radiation fins, it is obvious to be ideal that the electrochemical device portion serving as a heat generation portion is disposed with a space from another electrochemical device portion so that each of the electrochemical device portions is disposed at a position as close to outside air as possible, and the radiation member provided with the radiation fins is disposed at every position where the fuel cell is in contact with outside air.

On the other hand, it is undesirable that many electrochemical device portions serving as heat generation portions are disposed adjacent to each other. In this case, a region where a plurality of electrochemical device portions are disposed adjacent to each other cannot be in contact with outside air, and heat is easily accumulated therein. For example, in the electromotive portion 100 of Japanese Unexamined Patent Application Publication No. 2005-108717 shown in FIG. 4, the power generation cells 101a to 101c are stacked in three layers, and thus the power generation cells 101a and 101c provided at the ends in the stacking direction can be in contact with outside air at one of the main surfaces of each cell, while the power generation cell 101b provided at the center cannot be in contact with outside air at both main surfaces because both main surfaces are closed with the power generation cells 101a and 101c so that heat can be radiated through only the side surfaces having a small surface area.

A fuel cell of the embodiment includes an electrochemical device portion for power generation by a chemical reaction, and a radiation member disposed at a position in contact with outside air and provided with radiation fins for radiating heat generated in the electrochemical device portion, wherein the electrochemical device portion is disposed with a space from another electrochemical device portion or forms a pair of two electrochemical device portions provided adjacent to each other so that the pair is disposed with a space from another electrochemical device portion or another pair.

Therefore, when the electrochemical device portion is disposed alone, the periphery thereof is not closed with another electrochemical device portion so that heat can be sufficiently radiated from all peripheral surfaces. In addition, even when the electrochemical device portion is disposed to form the pair of two electrochemical device portions adjacent to each other, the electrochemical device portions are closed with each other at the surfaces on one side so that heat can be sufficiently radiated through the other surfaces. For example, when the electrochemical device portion has a plate-like shape, and a stack of two electrochemical device portions is disposed, the main surfaces on one side are closed with each other, while the main surfaces on the opposite side are not closed, thereby permitting sufficient heat radiation through the main surfaces on the opposite side.

In addition, in the fuel cell of the embodiment, a conductive member for exchanging a current generated in the electrochemical device portion with the outside is disposed in contact with the electrochemical device portion, and the radiation member is provided in contact with the conductive member or part or the whole of the radiation fins are provided on at least a portion of the conductive member, which is in contact with outside air, so that the conductive member serves as the radiation member. As a result, the heat generated in the electrochemical device portion is radiated to outside air by the radiation member at the shortest distance from the electrochemical device portion through the conductive member with excellent heat conductivity, and thus the heat is radiated with highest efficiency.

As described above, in the fuel cell of the present invention, the heat generated in the electrochemical device portion is efficiently radiated through the conductive member, and thus destabilization of power generation due to heat and decrease in generation efficiency can be prevented. In addition, the temperature can be stabilized without using a pump or a fin, the fuel cell is suitable for miniaturization and cost reduction. In particular, when the conductive member serves as the radiation member, the number of necessary members can be minimized.

Additional features and advantages are described herein, and will be apparent from, the following Detailed Description and the figures.

BRIEF DESCRIPTION OF THE FIGURES

FIG. 1(*a*) is an exploded perspective view and FIG. 1(*b*) is a sectional view, showing the structure of a power generation cell portion on the basis of an embodiment.

FIG. 3(*a*) is an exploded perspective view and FIG. 3(*b*) is a sectional view, showing the structure of DMFC on the basis of the same embodiment.

DETAILED DESCRIPTION

In a fuel cell of the present embodiment, preferably, the electrochemical device portion has a plate-like shape, and the conductive member is provided in contact with each of the two main surfaces. The electrochemical device portion includes two electrodes disposed opposite to each other, and an electrolyte disposed between the two electrodes, and, in many cases, the electrochemical device portion usually has a plate-like shape because the internal resistance decreases as the distance between the electrodes decreases. In this case, if the conductive member is provided in contact with each of the two main surfaces having the largest area, the radiation effect is maximized. However, the conductive member is not limited to this, and it is more effective to further provide the conductive member on a portion other than the main surfaces.

In addition, an inlet hole is preferably provided in the conductive member, for passing air or fuel to the electrochemical device portion.

In addition, the radiation fins are preferably formed by processing the surface of the radiation member. In this case, the radiation fins preferably have a pitch of 3 mm or less, a thickness of 1 mm or less, and a height of 3 mm or less. In this way, by providing many fine fins on the surface of the fuel cell, the heat generated in the electrochemical device portion can be efficiently radiated.

As a specific processing method, for example, the radiation fins may be formed by cutting and raising or digging the surface of the radiation member. In addition, the radiation fins may be formed by a fine groove forming method of forming a plurality of fine grooves (refer to, for example, Japanese Unexamined Patent Application Publication No. 2001-102782, Japanese Unexamined Patent Application Publication No. 2005-142247, and Japanese Unexamined Patent Application Publication No. 2005-254417).

The radiation member is preferably composed of a metal plate or a surface-treated metal plate. The metal plate is preferably composed of aluminum or copper which is a metal with high heat conductivity.

In addition, air is preferably supplied to the electrochemical device portion by natural diffusion and/or natural convection. As described above, an auxiliary part such as a pump, a blower, or the like inhibits miniaturization of a fuel cell and has the side of impairing the characteristic of a fuel cell, i.e., the high energy density. Therefore, when a fuel cell is used as a power supply for portable electronic apparatuses, preferably, the auxiliary part is used as few as possible, and air is supplied by natural diffusion and/or natural convection.

In addition, the fuel stored in a liquid state is preferably supplied in a vaporized state to the electrochemical device portion. In this case, the liquid fuel is preferably methanol or an aqueous methanol solution. As described above, methanol can be used without a reformer, has a high energy density, and is optimum fuel for a fuel cell for portable electronic apparatuses. The gas supply type of supplying vaporized methanol to the anode is a method which causes relatively little methanol crossover and preferably can suppress swelling of the polymer electrolyte membrane and stabilize the membrane-electrode assembly. Also, it is preferred to use a method of naturally evaporating fuel in a fuel tank without using the auxiliary part such as a pump, a heater, or the like because the auxiliary part inhibits miniaturization of a fuel cell.

A conventional fuel cell having the above-described configuration has the problem of destabilizing power generation due to the heat generated with power generation and decreasing generation efficiency. In contrast, in the fuel cell of the present invention, the heat generated in the electrochemical device portion is efficiently radiated through the radiation member to stabilize the temperature of the fuel cell, and thus the fuel cell of the present invention can be most effectively applied to a fuel cell having the above-described configuration. Namely, since the temperature of a fuel tank in which methanol is evaporated is stabilized, methanol crossover little occurs due to excessive supply of fuel. Since the temperature of the polymer electrolyte membrane is stabilized, water in the electrolyte membrane is properly maintained and can maintain high proton conductivity, and water necessary for a reaction on the anode can be stably supplied by back diffusion of water produced on the cathode.

In addition, liquid fuel such as methanol is generally used as fuel for a fuel cell for small portable apparatuses, but hydrogen occluded in a hydrogen storing alloy or the like can be used.

An example configured as a direct methanol fuel cell (DMFC) is described below as a fuel cell based on an embodiment with reference to the drawings. However, the present embodiment is not limited to this.

Figure 2:
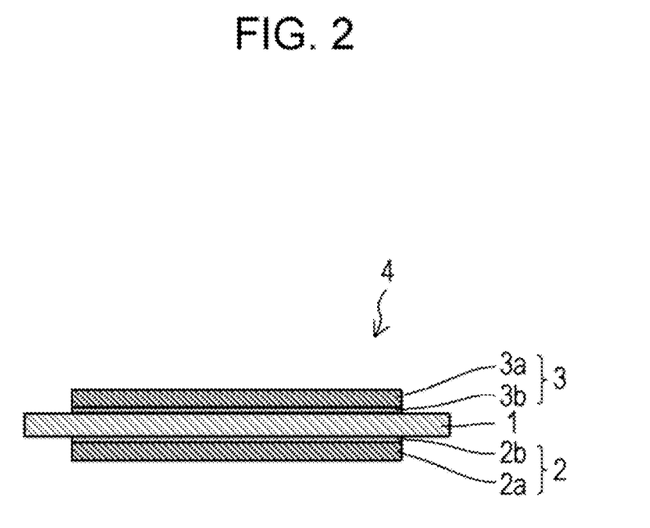
FIG. 2 is a sectional view showing the structure of a membrane-electrode assembly (MEA) on the basis of the same embodiment.

FIG. 2 is an enlarged sectional view showing a membrane-electrode assembly (MEA) 4 serving as the electrochemical device portion. As shown in FIG. 2, in the membrane-electrode assembly (MEA) 4, an anode 2 and a cathode 3 are bonded to both surfaces of a proton conductive polymer electrolyte membrane 1 composed of Nafion (registered trade name). The anode 2 includes a conductive porous support 2a composed of a carbon sheet or carbon cloth, and an oxidation catalyst layer 2b formed on the surface of the conductive porous support 2a and composed of a mixture of platinum or a platinum alloy as a catalyst and a proton conductor such as Nafion. The conductive porous support 2a has the function as a gas diffusion layer for passing gaseous methanol to the oxidation catalyst layer 2b and the function as a current collector which leads the current generated in the oxidation catalyst layer 2b. The cathode 3 includes a conductive porous support 3a composed of a carbon sheet or carbon cloth, and a reduction catalyst layer 3b formed on the surface of the conductive porous support 3a and composed of a mixture of platinum or a platinum alloy as a catalyst and a proton conductor such as Nafion. The conductive porous support 3a has the function as a gas diffusion layer for passing air to the reduction catalyst layer 3b and the function as a current collector which leads the current generated in the reduction catalyst layer 3b.

FIG. 1(a) is an exploded perspective view and FIG. 1(b) is a sectional view, showing the structure of a power generation cell portion 10. However, the sectional view (b) is a sectional view taken at a position shown by a dotted line in the perspective view (a). The membrane-electrode assembly 4 is disposed at a center of the power generation cell portion 10, and conductive plates 5 and 6 are pressure-bonded to the upper and lower surfaces of the membrane-electrode assembly 4. In order to enhance corrosion resistance, plating layers 5a and 6a are provided on the surfaces of the conductive plates 5 and 6, respectively, the surfaces being in contact with the membrane-electrode assembly 4. Each of the conductive plates 5 and 6 includes, for example, an aluminum plate or copper plate of 1 mm in thickness, and each of the plating layers 5a and 6a includes, for example, a gold plating layer with excellent corrosion resistance. The membrane-electrode assembly 4 and the conductive plates 5 and 6 are sealed with gaskets 7 and 8 provided between the assembly 4 and the conductive plates 5 and 6, respectively, the gaskets 7 and 8 being composed of, for example, a silicone rubber sheet of 0.5 mm in thickness.

An inlet hole 5b for introducing fuel gas and an inlet hole 6b for introducing air (oxygen) are provided at the centers of the conductive plates 5 and 6, respectively. In addition, openings 7a and 8a are provided in the gaskets 7 and 8, respectively. The size, shape, and arrangement of the inlet holes 5b and 6b significantly influence the characteristics of the fuel cell.

Figure 1:
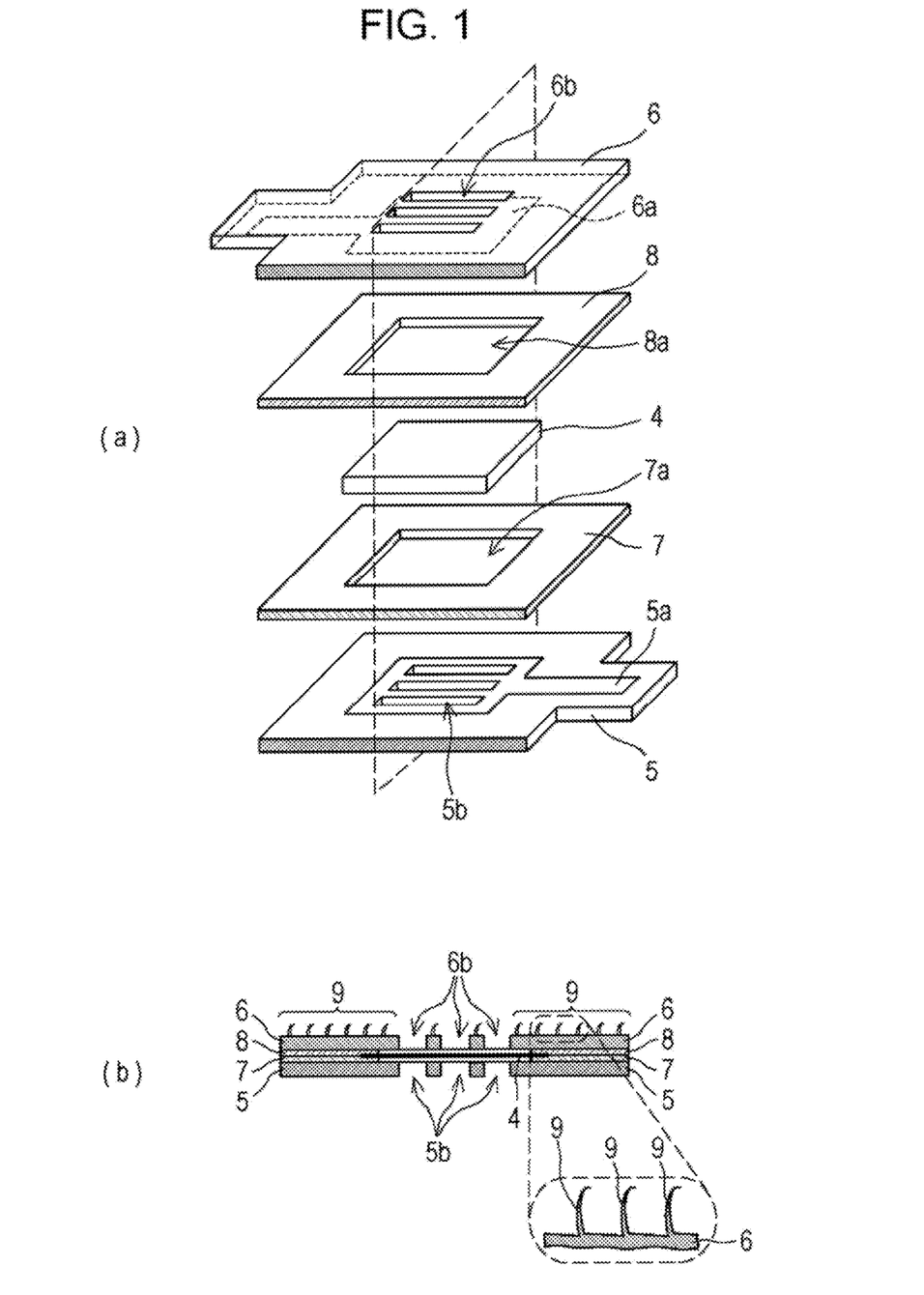

That is, when the hole area is increased, larger amounts of fuel gas and air (oxygen) can be passed to the membrane-electrode assembly 4, while when the area is excessively increased, the pressure applied to the anode 2 and the cathode 3 through the conductive plates 5 and 6 is decreased, and thus, contact resistance between the conductive plate 5 and the conductive porous support 2a and contact resistance between the conductive plate 6 and the conductive porous support 3a are increased, thereby possibly causing decrease in the characteristics of the cell. Conversely, when the hole area is decreased, the pressure applied to the anode 2 and the cathode 3 can be increased to decrease the contact resistances, while when the area is excessively decreased, the ability of passing fuel gas and air (oxygen) to the membrane-electrode assembly 4 is decreased, thereby possibly causing decrease in the characteristics of the cell. In this embodiment, the inlet holes 5b and 6b are arranged as shown in FIG. 1.

Although not shown in FIG. 1(a), FIG. 1(b) and a partial enlarged view show an example in which radiation fins 9 are formed on the surface of the conductive plate 6 serving as the conductive member. Although this example is an example in which the conductive member serves as the radiation member, for example, when the radiation member is desired to be electrically insulated from the conductive member, the radiation member may be attached to the conductive member. In addition, the radiation fins 9 may be provided on the conductive plate 5 or provided on both the plates 5 and 6.

The radiation fins 9 are formed by processing the surface of the conductive plate 6. In this case, the radiation fins 9 preferably have a pitch of 3 mm or less, a thickness of 1 mm or less, and a height of 3 mm or less. In this way, by providing many fine fins 9 on the surface of the conductive plate 6, which constitutes a surface in contact with outside air in the power generation cell portion 10, the heat generated in the membrane-electrode assembly 4 serving as the electrochemical device portion can be efficiently radiated.

As a specific processing method, for example, the radiation fins 9 may be formed by cutting and raising or digging the surface of the conductive plate 6. In addition, the radiation fins 9 may be formed by a fine groove forming method of forming a plurality of lines of fine grooves (refer to Japanese Unexamined Patent Application Publication No. 2005-142247, Japanese Unexamined Patent Application Publication No. 2005-254417, etc.). In forming the fine grooves, a cutting and raising tool having a cutting edge formed at the leading end in a moving direction and a metallic material are relatively moved under condition in which the cutting tool and a surface of the metallic material are at a predetermined angle to cut and raise the surface of the metallic material with the cutting edge of the cutting and raising tool, thereby raising plate-like fins and forming fine grooves. Then, the metallic material and the cutting and raising tool are relatively moved from an upstream side by a predetermined pitch from the processed surface formed by raising the fins, to cut and raise the surface of the metallic material with the cutting edge of the cutting and raising tool, thereby raising next plate-like fins and forming fine grooves. Then, the process of forming fins and fine grooves is sequentially repeated at a predetermined pitch using the cutting and raising tool, forming a plurality of lines of fine grooves between fins.

The metal plate on which the radiation fins 9 are formed as described above is cut into a predetermined size, and then the air inlet holes 6b are formed to obtain the conductive plate 6. The metal plate on which the radiating fins 9 are formed is cut into a predetermined size, and then may be attached to another surface requiring heat radiation. In this case, an appropriate adhesive is used, and care is given to prevent the adhesive from having high thermal resistance.

The heat radiation efficiency of a heat radiator is generally substantially proportional to the whole surface area of the heat radiator. In order to enhance the radiation effect of a heat radiator, therefore, it is necessary to increase the surface area by forming many radiation fins 9. However, heat radiation fins produced by conventional extrusion molding or casting have limitation in thinning the fins or forming many fins. The above-mentioned fin forming method can resolve this problem and can enhance the radiation performance.

Alternatively, the radiation fins 9 may be many tongue-like fins formed by cutting and raising projecting lines of an aluminum extruded material (refer to Japanese Unexamined Patent Application Publication No. 2001-102782).

FIG. 3(a) is an exploded perspective view and FIG. 3(b) is a sectional view, showing the structure of a fuel cell 40 configured as small DMFC. However, the sectional view (b) is a sectional view taken at a position shown by a dotted line in the perspective view (a).

The DMFC 40 is configured by a power generation cell portion 10, a fuel tank portion 30, and a partition portion 20 interposed between both portions. The partition portion 20 thermally cuts off between the power generation cell portion 10 and the fuel tank portion 30 by a heat-insulating partition 21, for preventing evaporation of liquid fuel 33 in the fuel tank portion 30 from being influenced by heat generated in the power generation cell portion 10.

The liquid fuel 33 such as methanol is stored in a fuel tank 31 of the fuel tank portion 30. As a material for the fuel tank 31, a material which can prevent the liquid fuel 33 in the fuel tank 31 from being influenced by surrounding environment is preferably used. When the fuel tank 31 is mounted on a small electronic apparatus or a small portable electronic apparatus, the fuel tank 31 preferably has some degree of toughness, lighter weight, and no adverse effect on surroundings.

Vent holes 32 are provided in the wall of the fuel tank 31, which is in contact with the heat-insulating partition 21, for supplying fuel gas, which is made gaseous by evaporation, to the power generation cell portion 10. The amount of fuel supplied to the power generation cell portion 10 per unit time depends on the opening area and shape of the vent holes 32.

Materials for the heat-insulating partition 21 include plastics such as polyethylene, polystyrene, and the like; inorganic materials such as porous ceramics and the like; natural materials such as cork and the like; and combinations thereof. A material having low thermal conductivity and necessary strength and workability is preferably selected.

Figure 3:
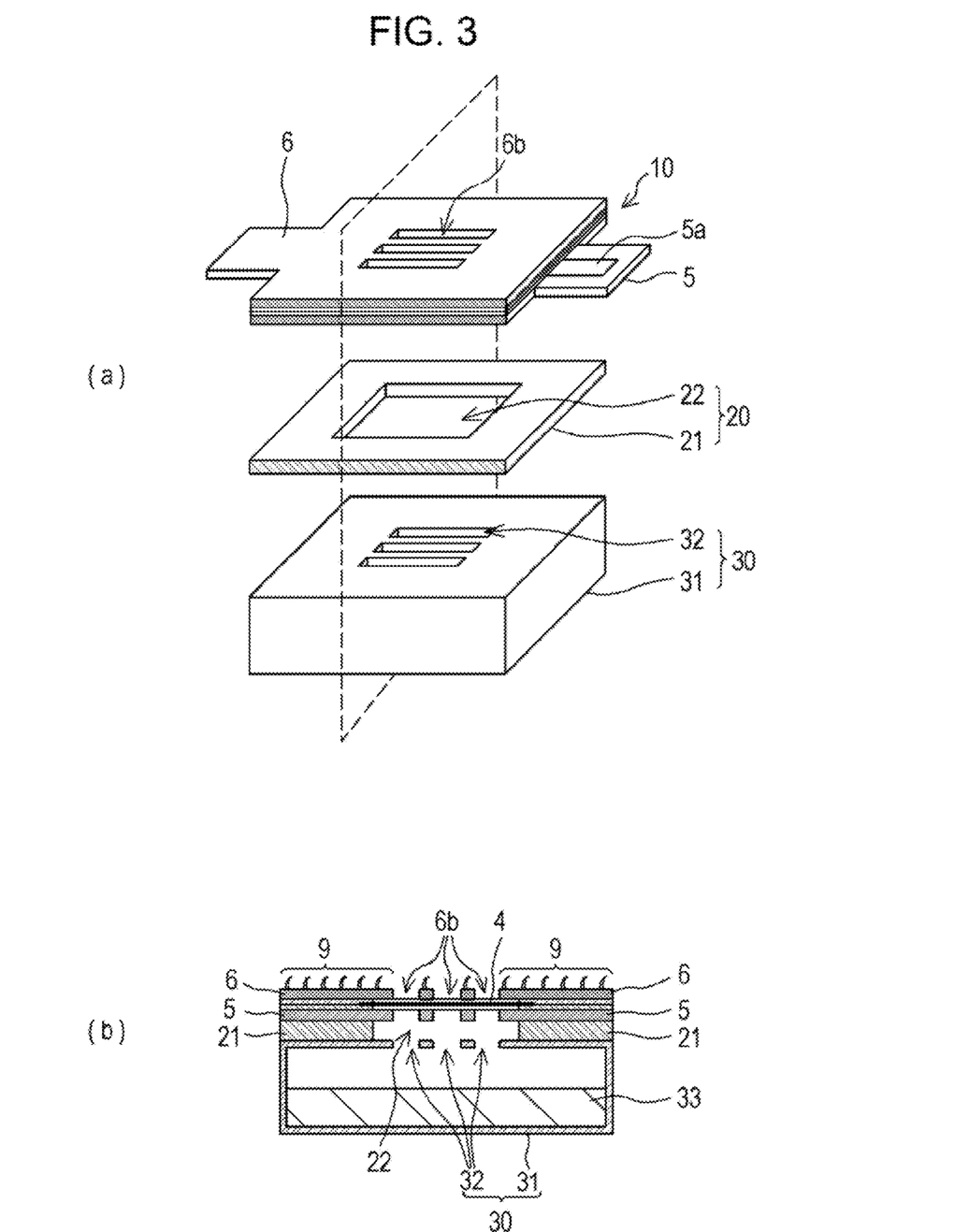

Since the liquid fuel 33 is evaporated in the fuel tank 31 and fuel gas passes through the heat-insulating partition 21 and is supplied to the power generation cell portion 10, it is necessary for the heat-insulating partition 21 to have a structure permeable to the fuel gas. FIG. 3 shows an example in which an opening 22 is provided in the heat-insulating partition 21. The opening 22 makes a uniform spacial distribution of the fuel gas in a supply amount controlled by the vent holes 32 and supplies the fuel gas to the power generation cell portion 10. In this case, as shown in FIG. 3, the opening 22 preferably has a size including the vent holes 32 because the effect of making a uniform spacial distribution of the fuel gas can be enhanced.

As the liquid fuel 33, methanol or an aqueous methanol solution is preferably used. As described above, methanol can be used without a reformer, has a high energy density, and is optimum fuel for a fuel cell for portable electronic apparatuses.

In the fuel cell 40, methanol as fuel is supplied in a gaseous state to the anode 2 and oxidized to carbon dioxide in the oxidation catalyst layer 2b on the anode side as shown by the following expression (1):

$$\text{Anode: } CH_3OH + H_2O \rightarrow CO_2 + 6H^+ + 6e^- \quad (1)$$

The hydrogen ions produced in this reaction move to the cathode side through the proton conductive polymer electrolyte membrane 1 which separates the anode 2 from the cathode 3 and reacts with oxygen in the reduction catalyst layer 3b on the cathode 3 side as shown by the following expression (2):

$$\text{Cathode: } 6H^+ + (3/2)O_2 + 6e^- \rightarrow 3H_2O \quad (2)$$

The reaction taking place over the whole of the fuel cell 40 is represented by combination of expressions (1) and (2), i.e., the following expression (3):

$$\text{Whole DMFC: } CH_3OH + (3/2)O_2 \rightarrow CO_2 + 2H_2O \quad (3)$$

EXAMPLES

The present embodiment is described in further detail below on the basis of nonlimiting examples.

Example 1

Preparation of Membrane-Electrode Assembly (MEA)

The membrane-electrode assembly (MEA) 4 shown in FIG. 2 was prepared as the electrochemical device portion constituting a fuel cell.

The anode 2 was prepared as follows: That is, first a catalyst (manufactured by Tanaka Kikinzoku Kogyo K. K.) including an alloy catalyst held on carbon and composed of platinum Pt and ruthenium Ru at a predetermined ratio and a Nafion (registered trade name, manufactured by Du Pont) dispersed aqueous solution (manufactured by Wako Chemicals, Ltd.) were mixed at a weight ratio of 7:3, and the resultant mixture was adjusted to proper viscosity by adding ion exchanged water to prepare a paste mixture. The paste mixture was applied to carbon paper (manufactured by Toray Industries, Inc) used as the conductive porous support 2a by a doctor blade method and then dried to form the oxidation catalyst layer 2b. The paper was cut into a square of 13 mm×13 mm to form the anode 2.

In addition, the cathode 3 was prepared by the same method as the above. That is, first a catalyst (manufactured by Tanaka Kikinzoku Kogyo K. K.) including a platinum catalyst held on carbon and a Nafion dispersed aqueous solution (manufactured by Wako Chemicals, Ltd.) were mixed at a weight ratio of 7:3, and the resultant mixture was adjusted to proper viscosity by adding ion exchanged water to prepare a paste mixture. The paste mixture was applied to carbon paper (manufactured by Toray Industries, Inc) used as the conductive porous support 3a by a doctor blade method and then dried to form the reduction catalyst layer 3b. The paper was cut into a square of 13 mm×13 mm to form the cathode 3.

Next, as the proton conductive polymer electrolyte membrane 1, a Nafion 112 (trade name, manufactured by Du Pont) membrane was cut into a square of 15 mm×15 mm, sandwiched between the anode 2 and the cathode 3, and subjected to thermocompressive bonding for 10 minutes under conditions including a temperature of 150° C. and a pressure of 1 MPa to prepare the membrane-electrode assembly (MEA) 4 in which the entire surfaces of the anode 2 and the cathode 3 faced each other with the proton conductive polymer electrolyte membrane 1 provided therebetween.

<Preparation of Power Generation Cell Portion>

The power generation cell portion 10 shown in FIG. 1 was prepared using the membrane-electrode assembly (MEA) 4. First, the air inlet holes 6b were formed in an aluminum plate having the fins 9 formed over the whole of one of the surfaces thereof, the fins 9 having a thickness of 0.2 mm, a height of 2 mm, and a pitch of 1.5 mm, and then the plating layer 6a was formed by gold plating to prepare the conductive plate 6. On the other hand, the fuel inlet holes 5b were formed in an aluminum plate without fins formed thereon, and then the plating layer 5a was formed by gold plating to prepare the conductive plate 5.

Next, the membrane-electrode assembly (MEA) 4 was sandwiched between the conductive plate 6 and the conductive plate 5 while short-circuiting between the conductive plate 6 and the conductive plate 5 was prevented by Teflon (registered trade name) gaskets 7 and 8, thereby forming the power generation cell portion 10.

<Power Generation Test of Power Generation Cell>

First, the partition portion 20 and the fuel tank portion 30 were connected to the power generation cell portion 10 to form the DMFC 40. In the DMFC 40, 0.2 mL of an aqueous methanol solution at a concentration of 80% by mass was introduced into the fuel tank 31, and methanol evaporated in the fuel tank 31 was supplied to the anode 2 to perform power generation in the power generation cell portion 10. The power generation was performed at room temperature and a constant current of 300 mA, and finished when the voltage was 0 V. The temperature of the power generation cell portion 10 was stabilized near 42° C. during the power generation, and the power generation could be continued for 40 minutes and 32 seconds.

Example 2

The fins 9 formed on the conductive plate 6 were changed to fins having a thickness of 0.05 mm, a height of 0.5 mm, and a pitch of 0.1 mm. The power generation cell portion 10 was formed by the same method as in Example 1 except the fins 9. As a result of a power generation test of the power generation cell portion 10 by the same method as in Example 1, the temperature of the power generation cell portion 10 was stabilized near 39° C. during the power generation, and the power generation could be continued for 47 minutes and 18 seconds.

Comparative Example 1

A conductive plate not having the fins 9 formed thereon was used as the conductive plate 6. The power generation cell portion 10 was formed by the same method as in Example 1 except the conductive plate 6. As a result of a power generation test of the power generation cell portion 10 by the same method as in Example 1, the temperature of the power generation cell portion 10 continuously increased during the power generation and the power generation test was finished when the temperature finally increased near 62° C. The time of power generation was 15 minutes and 24 seconds.

This is possibly due to the phenomenon that since heat generated from the fuel cell during power generation is not sufficiently radiated, water is evaporated from an oxygen inlet, the electrolyte is dried, and the amount of fuel vaporized is increased due to a high temperature, thereby causing crossover and failure in power generation.

As seen from the above description, heat generated due to a voltage loss during power generation is smoothly radiated by providing many fine fins 9 on a surface of the power generation cell portion 10 of a fuel cell, and thus it is possible to prevent the vicious circle that the electrolyte is dried by heat to cause further voltage loss and enlarge the problem of power generation and the vicious circle that the amount of fuel vaporized is increased due to heat, thereby causing crossover and thus further enlarging the problem of power generation.

A fuel cell provided by the present invention has a small and simple structure but causes no destabilization of power generation due to heat generated during the power generation and no decrease of generation efficiency, and thus can be used as a power supply for any portable electronic apparatus.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A fuel cell comprising:
   an electrochemical device portion in which power generation is performed by a chemical reaction;
   a radiation member disposed at a position in contact with outside air and provided with radiation fins for radiating heat generated in the electrochemical device portion, at least one of the radiation fins having a curved thinning profile in a direction away from the electrochemical device portion; and
   a conductive member for exchanging a current generated in the electrochemical device portion with the outside, wherein
   the electrochemical device portion is disposed with a space from another electrochemical device portion or forms a pair of two electrochemical device portions provided adjacent to each other so that the pair is disposed with a space from another electrochemical device portion or another pair,
   the conductive member includes a first surface disposed in contact with the electrochemical device portion and a second surface opposite the first surface and in contact with outside air,
   at least one inlet hole is provided in the conductive member in order to pass air to the electrochemical device portion, and
   the radiation member is provided in contact with the second surface of the conductive member, or part or the whole of the radiation fins are formed on at least a portion of the second surface of the conductive member.

2. The fuel cell according to claim 1, wherein the electrochemical device portion has a plate-like shape, and the conductive member is disposed in contact with each of two main surfaces of the electrochemical device portion.

3. The fuel cell according to claim 1, wherein the radiation fins are formed by processing a surface of the radiation member.

4. The fuel cell according to claim 3, wherein the radiation fins have a pitch of 3 mm or less, a thickness of 1 mm or less, and a height of 3 mm or less.

5. The fuel cell according to claim 3, wherein the radiation fins are formed by cutting and raising or digging a surface of the radiation member.

6. The fuel cell according to claim 3, wherein the radiation fins are formed by a groove forming method of forming a plurality of lines of grooves.

7. The fuel cell according to claim 1, wherein the radiation member includes a metal plate or a surface-treated metal plate.

8. The fuel cell according to claim 7, wherein the metal plate is composed of aluminum or copper.

9. The fuel cell according to claim 1, wherein air is supplied to the electrochemical device portion by natural diffusion and/or natural convection.

10. The fuel cell according to claim 1, wherein a fuel stored in a liquid state is supplied in an evaporated state to the electrochemical device portion.

11. The fuel cell according to claim 10, wherein the liquid fuel is methanol or an aqueous methanol solution.

12. The fuel cell according to claim 1, wherein part or the whole of the radiation fins are formed on at least a portion of the second surface of the conductive member, and the portion of the second surface on which the radiation fins are formed is opposite a portion of the first surface in contact with the electrochemical device portion.

13. The fuel cell according to claim 1, wherein the radiation fins extend from the radiation member in a direction perpendicular to the second surface of the conductive member.

14. The fuel cell according to claim 1, wherein the electrochemical device portion is a membrane electrode assembly including an anode, a cathode and an electrolyte membrane.

15. The fuel cell according to claim 1, wherein the conductive member comprises a metallic plate.

16. The fuel cell according to claim 1, wherein the radiation fins extend in a direction substantially perpendicular to the first surface of the conductive member.

* * * * *